United States Patent [19]

Sato

[11] Patent Number: 5,089,768
[45] Date of Patent: Feb. 18, 1992

[54] POWER SOURCE DEVICE WITH CONTROL OF VOLTAGE CHANGE SPEED

[75] Inventor: Shoji Sato, Yokohama, Japan

[73] Assignee: Canon Kabushiki Kaisha, Tokyo, Japan

[21] Appl. No.: 487,433

[22] Filed: Mar. 2, 1990

[30] Foreign Application Priority Data

Mar. 22, 1989 [JP] Japan ................................ 1-67469

[51] Int. Cl.⁵ .............................................. G05B 24/02
[52] U.S. Cl. ...................................... 323/318; 323/234; 323/265; 323/282; 323/349; 323/351
[58] Field of Search .................. 323/220, 222–226, 323/234, 265–290, 318, 349–351, 364, 369, 370

[56] References Cited

U.S. PATENT DOCUMENTS

| | | | |
|---|---|---|---|
| 3,381,202 | 4/1968 | Louks et al. | |
| 3,399,339 | 8/1968 | Yeager | |
| 3,403,321 | 9/1968 | Mosak | |
| 3,453,519 | 7/1969 | Hunter | |
| 3,512,044 | 5/1970 | Jones | |
| 3,541,420 | 11/1970 | Rees | |
| 3,546,566 | 12/1970 | Marzolf | |
| 3,560,842 | 2/1971 | Caprari | |
| 3,723,774 | 3/1973 | Rogers | 323/277 |
| 3,819,986 | 6/1974 | Fukuoka | 323/276 |
| 3,916,294 | 10/1975 | Kennedy | 323/275 |
| 3,986,102 | 10/1976 | Morita | 323/281 |
| 4,495,472 | 1/1985 | Dwarakanath | 323/273 |
| 4,598,243 | 7/1986 | Kawakami | 323/349 |
| 4,754,388 | 6/1988 | Pospisil | 323/266 |
| 4,810,948 | 3/1989 | Takuma | 323/280 |
| 4,829,259 | 5/1989 | Konopka | 323/278 |

*Primary Examiner*—Jeffrey Sterrett
*Attorney, Agent, or Firm*—Fitzpatrick, Cella, Harper & Scinto

[57] ABSTRACT

The invention relates to a power source circuit in which an output of a power source battery is converted by a voltage regulator constructed by a predetermined voltage regulating system and is output, an output voltage is divided by a resistance controller whose voltage dividing resistance value can be discontinuously adjusted, the divided voltage is input to the voltage regulator, and thereby controlling an output voltage, wherein means for controlling a voltage changing speed of a resistor is connected in parallel with a predetermined resistance element of the resistance controller. With the above construction, a voltage drop and a deterioration of voltage regulating efficiency which easily occur in the case of changing the output voltage from a low value to a high value in a stepwise manner are reduced. Then, the life of battery is prolonged and, further, an erroneous warning of the battery life is prevented.

10 Claims, 2 Drawing Sheets

POWER SOURCE DEVICE WITH CONTROL OF VOLTAGE CHANGE SPEED

BACKGROUND OF THE INVENTION

1. Field of The Invention

The present invention relates to a power source circuit and, more particularly, to a power source circuit in which an output of a power source battery is regulated by a voltage regulator which is constructed by a predetermined voltage regulating system and is output, an output voltage is divided by a resistance circuit whose voltage dividing resistance value can be discontinuously adjusted, a divided voltage is input to the voltage regulator, and thereby controlling the output voltage.

2. Related Background Art

Hitherto, there has been known a technique in which an output voltage of a power source such as a battery or the like is stepped up or dropped down by using a voltage regulator such as DC/DC converter, series regulator, or the like and is used.

In such a kind of apparatus, there has been known a technique in which in the case of variably controlling an output voltage, an output voltage of the regulator is divided by a resistor, the voltage divided value is fed back to the regulator, the feedback voltage is adjusted by a variable resistor, a resistor which is switched, or the like, and thereby continuously switching the output voltage.

In the above technique, particularly, in the case of switching the output step by step such as 5 V, 6 V, 9 V, or the like, a voltage drop occurs in accordance with an internal resistance of the battery voltage on the input side upon switching of the voltage. However, hitherto, it seems that such a voltage drop is not regarded as an important factor.

In the method of continuously changing the output voltage by using a variable resistor or the like, the battery voltage does not suddenly change at an ordinary operating speed. However, in the case of variably changing the voltage step by step by switching the resistor, if it is intended to change the output voltage from a low value to a high value, a charge current suddenly flows from the battery to the output capacitor, a terminal voltage of the battery remarkably drops, and a regulating efficiency of the voltage regulator deteriorates.

On the other hand, since a certain period of time is needed until the battery voltage is recovered, if an apparatus such as a printer which is provided in an electronic apparatus and whose current consumption is large operates during such a battery voltage recovery time, the voltage further remarkably drops and if such a phenomenon is repeated, an adverse influence is finally exerted on the life of battery.

On the other hand, there has been known a technique such that the timing suitable to exchange the battery is discriminated on the basis of the drop state of the battery voltage and the battery life is warned. However, in such a case, there is a fear such that a warning is generated at a wrong timing due to the voltage drop as mentioned above.

SUMMARY OF THE INVENTION

It is the first object of the present invention that a change in control voltage which is fed back to the voltage regulator is made gentle and a voltage drop of a battery due to a rush current upon switching of the voltage can be reduced.

The second object of the invention is to provide a voltage control system in which a sudden voltage drop of a battery upon switching of the voltage is prevented and no influence is exerted on the control based on the detection of the power source voltage.

DETAILED DESCRIPTION OF THE PREFERRED EMBODIMENTS

Figure 1:
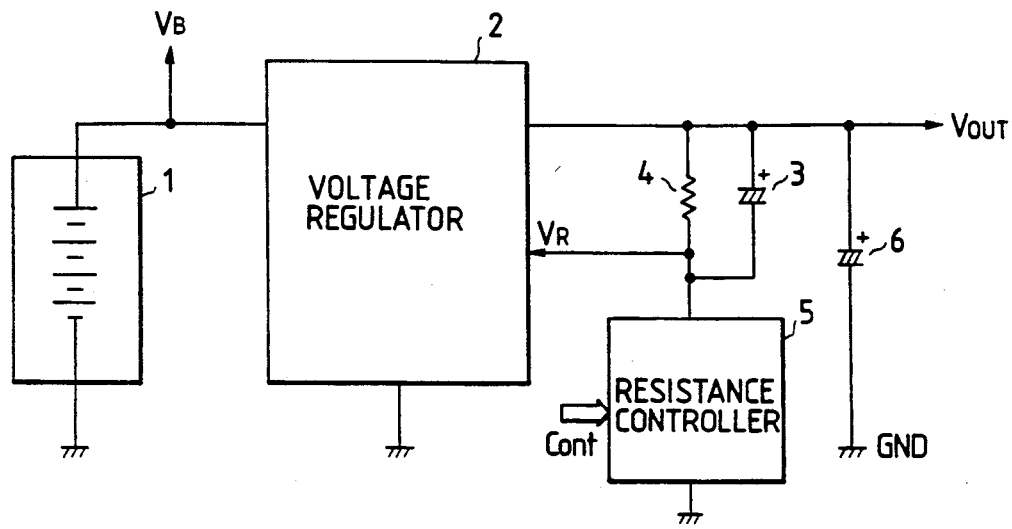
FIG. 1 is a block diagram of a power source apparatus to which the present invention is applied.

The present invention will be described in detail hereinbelow on the basis of embodiments shown in the drawings.

FIG. 1 shows a structure of a power source apparatus to which the present invention is applied.

In FIG. 1, reference numeral 1 denotes a battery and 2 indicates a voltage regulator for regulating an output voltage $V_B$ of the battery 1 to a voltage $V_{OUT}$ which is necessary for the apparatus. The voltage regulator 2 is constructed by a switching regulator, a series regulator, or the like.

The output voltage $V_{OUT}$ of the voltage regulator 2 is supplied to an electronic apparatus having therein the circuit of FIG. 1 or to a composing circuit of an electronic apparatus which is separately provided.

The voltage $V_{OUT}$ is divided by a resistor 4 and a resistance controller 5. A divided voltage value $V_R$ is fed back to the voltage regulator 2. The voltage regulator 2 compares a predetermined reference voltage which is formed by a Zener diode or the like with the feedback voltage $V_R$ and changes a switching duty ratio (or a conduction degree of a transistor to control a power source line) or the like in accordance with a comparison output, thereby controlling the output voltage $V_{OUT}$ to a predetermined voltage.

The resistance controller 5 is constructed by a series resistor (or a variable resistor) which is switched or the like and controls a resistance value of the resistance controller 5 in accordance with a control siganl CONT.

A smoothing capacitor 6 is arranged between the output voltage $V_{OUT}$ and a ground potential GND in order to regulate the output voltage so as not to be fluctuated due to a load.

The construction shown above is substantially the same as that of the conventional apparatus except that, in the embodiment, the resistor 4 is connected in parallel with a capacitor 3.

The capacitor 3 is used to prevent a rush current for the purpose of that when the output voltage $V_{OUT}$ changes from a low voltage to a high voltage by the resistor 4 and resistance controller 5, the flow of a charge current flowing from the battery 1 to the capacitor 6 is limited to thereby make an increasing change of the output voltage $V_{OUT}$ gentle.

Figure 2:
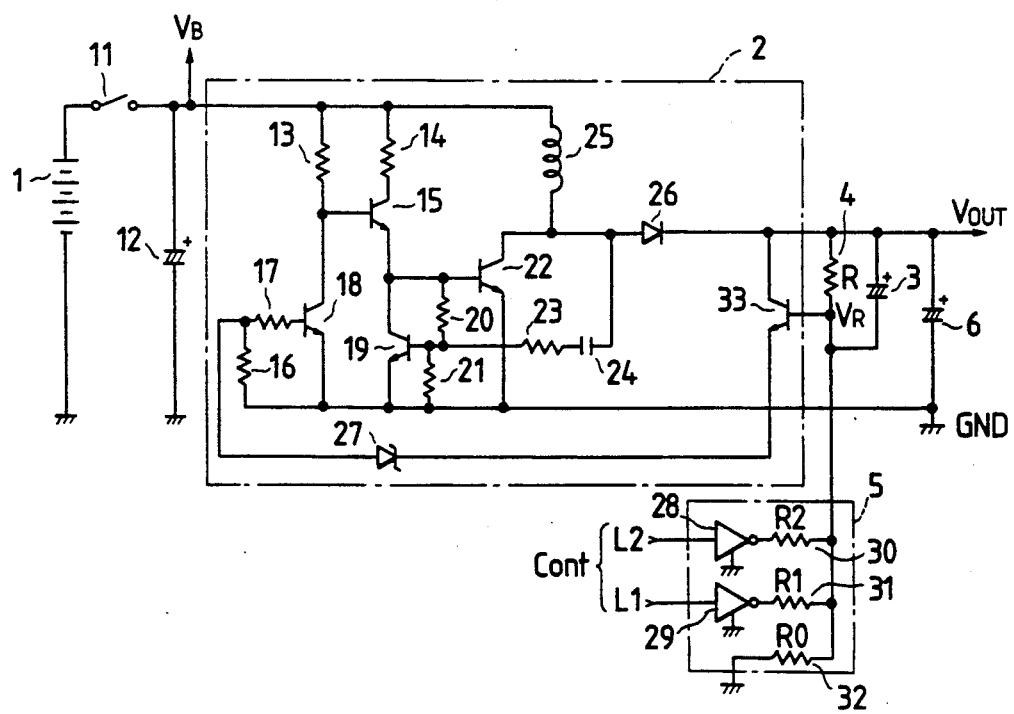
FIGS. 2 and 3 are circuit diagrams showing different embodiments of FIG. 1, respectively.

FIG. 2 shows more practically the circuit of FIG. 1.

In FIG. 2, the voltage regulator 2 is constructed by a well-known step-up type DC/DC converter. The construction and the operation of the voltage regulator 2 of FIG. 2 will be briefly explained.

In FIG. 2, it is assumed that the power source has been turned on by a power switch 11 and the voltage $V_{OUT}$ has been set to a certain value. At this time, the output volta $V_{OUT}$ is determined by feeding back the voltage $V_R$ which was divided by both of the resistor 4 (resistance value R) and either one of resistors 30 (resistance value $R_2$), 31 (resistance value $R_1$), and 32 (resistance value $R_0$) in the resistance controller 5 to the voltage regulator 2. The resistors 30 and 31 in the resistance controller 5 can be respectively independently connected to the ground by analog switches 28 and 29. With the above construction, a synthetic resistance of the resistance controller 5 can be adjusted to a desired output voltage value.

The opening/closing operations of the analog switches 28 and 29 are controlled by control signals $L_2$ and $L_1$ (CONT in FIG. 1), respectively. The resistors 30 and 31 are connected to the ground when the control signals $L_1$ and $L_2$ are at the high level.

The voltage $V_R$ is determined substantially by a value of a Zener diode 27. When the value of the output voltage $V_{OUT}$ decreases due to a load, the voltage $V_R$ also decreases, the current flowing through the Zener diode 27 is reduced, and a transistor 18 is soon turned off.

When the transistor 18 is turned off, a base current flows in a transistor 15 through a resistor 13 by the output voltage $V_B$ of the battery, so that the transistor 15 is turned on. Thus, a base current flows in a transistor 22 through a resistor 14 and collector emitter of the transistor 15. Also, the current flows to a ground potential GND through resistors 20 and 21.

When the base current of the transistor 22 is set to a high voltage enough to turn on the transistor 22, the transistor 22 is turned on and one end of the coil 25 is connected to the ground.

After that, a base potential of a transistor 19 rises by the current flowing to the resistor 21 and the transistor 19 is soon turned on. Thus, a base of the transistor 22 is connected to the GND and the transistor 22 is turned off. A high voltage is developed to a collector of the transistor 22 by the energy accumulated in a coil 25. This energy is charged into the capacitor 6 through a diode 26.

At the same time, the output voltage $V_{OUT}$ slightly rises and a current flows through the Zener diode 27 and the transistor 18 is turend on. Since a base of the transistor 15 is connected to the ground, the transistor 15 is turned off and the transistor 22 is also turned off. Therefore, after the energy accumulated in the coil 25 was completely charged into the capacitor 6, the supply of the output current of the output voltage $V_{OUT}$ is started from the charged amount of the capacitor 6. The voltage $V_{OUT}$ again starts decreasing and is returned to the initial state of the invention.

As mentioned above, the voltage regulator 2 forms the output voltage $V_{OUT}$ while oscillating at a certain frequency. In FIG. 2, reference numeral 17 denotes a base current limiting resistor of the transistor 18; 16 indicates a resistor to specify a level; and 23 and 24 represent resistors to return AC fluctuation component to the transistor 19.

In the voltage regulator 2 which execute the operation as mentioned above, a change state of the voltage $V_{OUT}$ in the case where the capacitor 3 is provided will now be described with reference to FIG. 4.

When the power switch 11 is turned on and both of the control signals $L_1$ and $L_2$ are set to the low level, $$V_{out} = \frac{R + R_0}{R_0} V_R$$

The output voltage at this time assumes $V_{OUT0}$.

Next, when $L_1$=high level and $L_2$=low level, $$V_{out} = \frac{R + (R_0 \| R_1)}{(R_0 \| R_1)} V_R$$

The output voltage at this time assumes $V_{OUT1}$.

Subsequently, when $L_1$=low level and $L_2$=high level, $$V_{out} = \frac{R + (R_0 \| R_2)}{(R_0 \| R_2)} V_R$$

The output voltage at this time assumes $V_{OUT2}$ ($R_A \| R_B$) denotes a parallel resistance value of resistance values RA and RB By properly selecting the values of resistances R, $R_0$, $R_1$, and $R_2$, the relations of $V_{OUT0}$ $V_{OUT2}$ can be obtained.

Figure 4A:
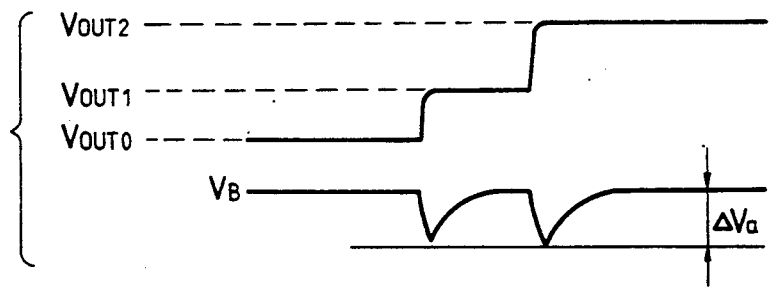
FIG. 4A is a graph showing an output voltage in the case where a capacitor to prevent a rush current is not inserted and an output voltage of a battery.
Figure 4B:
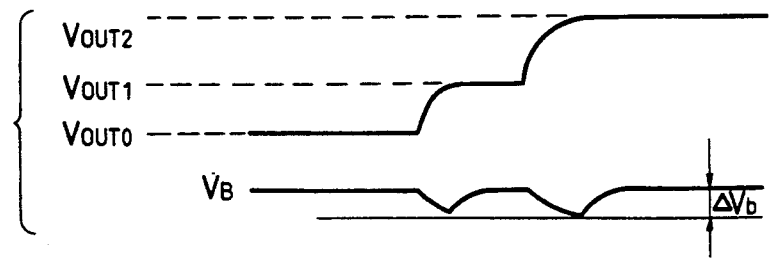
FIG. 4B is a graph showing an output voltage. of a circuit in the case where the capacitor to prevent a rush current is inserted and an output voltage of the battery.

A change state of the output voltage $V_{OUT}$ when the output voltage $V_{OUT}$ changes such that VOUT0 →$V_{OUT1}$ →$V_{OUT2}$ and a change state of the output voltage $V_B$ of the battery will now be separately described with respect to the case where the capacitor 3 is not inserted (FIG. 4A) and the case where the capacitor 3 is inserted FIG. 4B).

First, in the case where the output voltage $V_{OUT}$ changes such that $V_{OUT0}$→$V_{OUT1}$ or $V_{OUT1}$→$V_{OUT2}$, since an impedance of the coil 25 is very small, the increasing time of the output voltage $V_{OUT}$ is a very short time in promptly correspondence to a change in voltage dividing resistance as shown in FIG. 4A. On the contrary, the battery voltage $V_B$ largely drops due to a rush current to the capacitor 6.

On the other hand, when the capacitor 3 is inserted, in the case where the output voltage $V_{OUT}$ changes such that $V_{OUT0}$→$V_{OUT1}$ or $V_{OUT1}$→$V_{OUT2}$, the voltage across the resistor 4 gradually changes. The increasing change in output volta $V_{OUT}$ becomes gentle in association with it and the output voltage $V_{OUT}$ changes as shown in FIG. 4B. Therefore, the rush current flowing into the capacitor 6 is suppressed and a voltage drop degree of the battery voltage $V_B$ is small. As will be obviously understood from the comparison between the graphs of FIGS. 4(A) and 4(B), there is the relation of $$\Delta V_a > \Delta V_b$$

If the capacitance value of the capacitor 3 is set to a large value, the increasing change of the output voltage $V_{OUT}$ at this time becomes gentle.

In FIG. 2, a capacitor 12 operates so as to stabilize the battery voltage $V_B$.

As mentioned above, according to the embodiment of FIG. 1, by inserting the capacitor 3 in parallel with the resistor to detect the output voltage, a change in detection value which is fed back to the voltage regulator 2 is made gentle and a voltage drop of the battery 1 due to the rush current upon switching of the voltage can be reduced. Therefore, there are excellent advantages such that an adverse influence is not exerted on the life of the battery and even in the case of detecting the battery life through the output voltage of the battery, no erroneous detection occurs.

Figure 3:
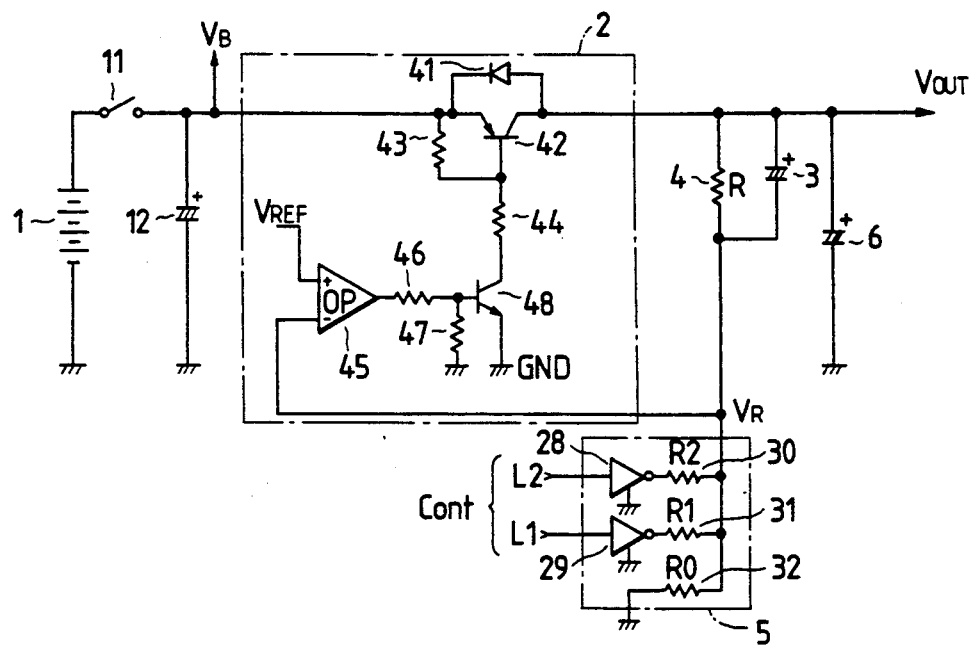

FIG. 3 shows the second embodiment of the invention, in which a series regulator is used as the voltage regulator 2.

In FIG. 3, reference numeral 1 denotes the battery as a power source; 11 indicates the power switch; 12 the capacitor to stabilize the power voltage; and 2 the voltage regulator.

The construction and operation of the voltage regulator 2 will now be described hereinbelow.

It is now assumed that the power source has been turned on by the power switch 11 and the voltage $V_{OUT}$ has been set to a certain value. For the output voltage $V_{OUT}$ at this time, the voltage $V_R$ which is obtained by dividing by both of the resistor 4 (R) and either one of the resistors 30 ($R_2$), 31 ($R_1$), and 32 ($R_0$) in the resistance controller 5 is used as a reference value. When the value of the output voltage $V_{OUT}$ decreases by a load, the voltage $V_R$ is also reduced. There is a relation of $V_{REF} > V_R$ between an input voltage $V_{REF}$ of the operational amplifier and the voltage $V_R$. A current flows to a base of a transistor 48 through a resistor 46 and the transistor 48 is turned on.

Due to this, a current flows to a base of a transistor 42 through a resistor 44, so that the transistor 42 is turned on. Thus, the current is charged into the capacitor by the output voltage $V_B$ of the battery through the transistor 42 and the output voltage $V_{OUT}$ slightly rises.

Thus, the voltage $V_R$ also rises, the input voltage of an operational amplifier 45 has a relation of $V_{REF} > V_R$, output voltage of the operational amplifier 45 is set to the low level. Thus, the transistor 48 is turned off and the transistor 42 is also further turned off.

Therefore, the power supply of the output voltage $V_{OUT}$ is shut out and the current of the charged amount in the capacitor 6 is supplied to the load of $V_{OUT}$. Due to this, the output voltage $V_{OUT}$ again starts decreasing and the relation of $V_{REF} > V_R$ is soon obtained and the foregoing operation is repeated. The voltage regulator 2 oscillates at a certain frequency.

The voltage $V_{OUT}$ in the case of applying the present invention to the voltage regulator 2 which operates as mentioned above is similar to that in the first embodiment. When the control signals $L_1$ and $L_2$ are at the low level, the output $V_{OUT}$ is $$V_{out0} = \frac{R + R_0}{R_0} V_R = \frac{R + R_0}{R_0} V_{REF}$$

when $L_1$ = high level and $L_2$ = low level, $$V_{out1} = \frac{R + (R_0 \| R_1)}{(R_0 \| R_1)} V_R$$
$$= \frac{R + (R_0 \| R_1)}{(R_0 \| R_1)} V_{REF}$$

When $L_1$ = low level and $L_2$ = high level, $$V_{out2} = \frac{R + (R_0 \| R_2)}{(R_0 \| R_2)} V_R$$
$$= \frac{R + (R_0 \| R_2)}{(R_0 \| R_2)} V_{REF}$$

By properly selecting the resistance values of R, $R_0$, $R_1$, and $R_2$, the relation of $V_{OUT0} < V_{OUT1} > V_{OUT2}$ can be obtained.

Changing states of the output voltage $V_{OUT}$ when it was changed such that $V_{OUT0} \rightarrow V_{OUT1} \rightarrow V_{OUT2}$ and the output voltage $V_B$ of the battery are similar to those shown in FIG. 4 mentioned above. Even in the case of using the series regulator as mentioned above, the advantages similar to those in the above embodiment can be also obtained.

As will be obvious from the above description, according to the invention, in a power source circuit in which an output of a power source battery is regulated by a voltage regulator constructed by a predetermined voltage regulating system and the regulated voltage is output, the otuput voltage is divided by a resistance controller whose voltage dividing resistance value can be discontinuously adjusted, the divided output voltage is input to the voltage regulator, and thereby controlling the output voltage, means for controlling a voltage changing speed of the resistance is connected in parallel with a predetermined resistance element in the resistance controller. Therefore, a change in control voltage which is fed back to the voltage regulator is made gentle and a voltage drop of the battery due to the rush current upon witching of the voltage can be reduced. Therefore, there are obtained excellent advantages such that an adverse influence is not exerted on the life of battery and even in the case of detecting the battery life through an output voltage of the battery, no erroneous detection occurs.

What is claimed is:

1. A power source circuit supplying an output voltage which can be switched among a plurality of voltage values, comprising:
   voltage regulating means having an input section connected to a DC power source and an output section for regulating a voltage applied to the input section and outputting the regulated voltage;
   first resistor means connected to the output section of said voltage regulating means;
   second resistor means consisting of a plurality of resistors connected to the output section of said voltage regulating means through said first resistor means;
   control means for controlling said second resistor means to change its resistance by selecting a desired one of the plurality of resistors so as to switch the output voltage supplied by said power source circuit from one value to another;
   feedback means for feeding back a feedback voltage output from a connecting portion between said first and second resistor means to said voltage regulating means; and
   capacitor means connected in parallel with said first regulator means for controlling the speed of change in the feedback voltage upon switching the output voltage.

2. A power source circuit according to claim 1, wherein the voltage regulating means has:
   an element to give a reference voltage; and a circuit for comparing the reference voltage given by said element with the feedback voltage which was fed back by the feedback means and for controlling an output voltage of the output section to a predetermined voltage in accordance with a comparison output.

3. A power source circuit according to claim 2, wherein said element to give the reference voltage is a Zener diode.

4. A power source circuit according to claim 2, wherein said comparing circuit has an operational amplifier for comapring the reference voltage and the feedback voltage and outputting a comparison result.

5. A power source circuit according to claim 1, wherein said second resistor means is constructed by a plurality of sets of connection members each comprising an analog switch and a resistor.

6. A power source circuit supplying an output voltage which can be switched among a plurality of voltage values, comprising:

voltage regulating means having an input section connected to a DC power source and an output section for regulating a voltage applied to the input section and outputting the regulated voltage;

first resistor means connected to the output section of said voltage regulating means;

second resistor means connected to the output section of said voltage regulating means through said first resistor means and constructed by a plurality of pairs of an analog switch and a resistor element connected to the analog switch, wherein resistance of said second resistor means is changed by selecting a desired one of the plurality of pairs of an analog switch and resistor element so as to switch the output voltage supplied by said power source circuit from one value to another;

feedback means for feeding back to said voltage regulating means a feedback voltage output from a connecting portion among said capacitor means, said first resistor means, and said second resistor means; and capacitor means connected in parallel with said first resistor means for controlling the speed of change in the feedback voltage upon switching the output voltage.

7. A power source circuit according to claim 6, wherein said second resistor means can adjust an input voltage to a predetermined output voltage value by a control of a synthetic resistance value based on the selective operation of the analog switch.

8. A power source circuit according to claim 6, wherein the voltage regulating means has:

an element to give a reference voltage; and a circuit for comparing the reference voltage given by said element with the feedback voltage which was fed back by the feedback means and for controlling an output voltage of the output section to a predetermined voltage in accordance with a comparison output.

9. A power source circuit according to claim 8, wherein the element to give the reference voltage is a Zener diode.

10. A power source circuit according to claim 8, wherein said comparing circuit has an operational amplifier for comparing the reference voltage and the feedback voltage and outputting a comparison result.

* * * * *

UNITED STATES PATENT AND TRADEMARK OFFICE
CERTIFICATE OF CORRECTION

PATENT NO. : 5,089,768

DATED : February 18, 1992

INVENTOR(S) : SHOJI SATO

It is certified that error appears in the above-identified patent and that said Letters Patent is hereby corrected as shown below:

COLUMN 4

Line 23, "$V_{OUT2}$" should read --$V_{OUT2}$.--.
Line 25, "RA and RB" should read --$R_A$ and $R_B$.--.
Line 27, "$V_{OUT0}$ $V_{OUT2}$" should read --$V_{OUT0}<V_{OUT1}<V_{OUT2}$--.

COLUMN 5

Line 38, "output" should read --and an output--.

COLUMN 6

Line 9, "$V_{OUT0}<V_{OUT1}>V_{OUT2}$" should read --$V_{OUT0}<V_{OUT1}<V_{OUT2}$--.

Signed and Sealed this

Fifteenth Day of June, 1993

Attest:

MICHAEL K. KIRK

*Attesting Officer*  *Acting Commissioner of Patents and Trademarks*